(12) United States Patent
Studer et al.

(10) Patent No.: US 7,001,970 B2
(45) Date of Patent: Feb. 21, 2006

(54) METHOD OF MANUFACTURING AN ENAMEL HAVING A LOW COEFFICIENT OF FRICTION, AND AN ELECTRICAL CONDUCTOR COATED IN SUCH AN ENAMEL

(76) Inventors: Virginie Studer, 45, rue de la Republique, 69680 Chassieu (FR); Arnaud Piechazyk, 22, avenue du Marechal de Saxe, 69006 Lyons (FR); Laurent Schildknecht, 44, route de Genas, 69003 Lyons (FR)

( * ) Notice: Subject to any disclaimer, the term of this patent is extended or adjusted under 35 U.S.C. 154(b) by 0 days.

(21) Appl. No.: 10/321,293

(22) Filed: Dec. 17, 2002

(65) Prior Publication Data

US 2003/0215650 A1   Nov. 20, 2003

(30) Foreign Application Priority Data

Dec. 21, 2001 (FR) .................................. 01 17131

(51) Int. Cl.
*C08G 77/04* (2006.01)
(52) U.S. Cl. ............................ 528/26; 528/28; 528/29; 174/110 R; 174/110 S
(58) Field of Classification Search ............ 174/110 R, 174/110 S; 528/25, 26, 27, 28, 29
See application file for complete search history.

(56) References Cited

U.S. PATENT DOCUMENTS 3,681,282 A   8/1972  Preston et al. .......... 260/46.5 E 6,214,462 B1 *  4/2001  Andre et al. ................. 428/375

FOREIGN PATENT DOCUMENTS

EP    588560 A2    3/1994

OTHER PUBLICATIONS

Preliminary Search report for dated Sep. 9, 2002.

* cited by examiner

*Primary Examiner*—Marc Zimmer
(74) *Attorney, Agent, or Firm*—Sofer&Haroun,LLP

(57) ABSTRACT

The present invention relates to a method of manufacturing enamels selected from: polyurethanes, polyamides, polyamide-imides, polyesters, polyester-imides, polyester amide-imides, polyimides, polyepoxy compounds, and polyphenyl oxide compounds; said method comprising an operation in which a functionalized polysiloxane oligomer is obtained by causing a functionalized polysiloxane having a reactive first functional group to react with a first functionalized monomer used in synthesizing said enamel, said first monomer having a second functionalized group that reacts with said first functional group. According to the invention, the method subsequently comprises the following operations:

said functionalized polysiloxane oligomer is caused to react with a second functionalized monomer that is used in synthesizing said enamel, said second monomer having a third functional group that reacts with said functionalized polysiloxane oligomer, thereby obtaining a grafted polysiloxane having organic chains that are identical to those of said enamel; and said enamel is synthesized using said first and second monomers and said grafted polysiloxane.

5 Claims, 1 Drawing Sheet

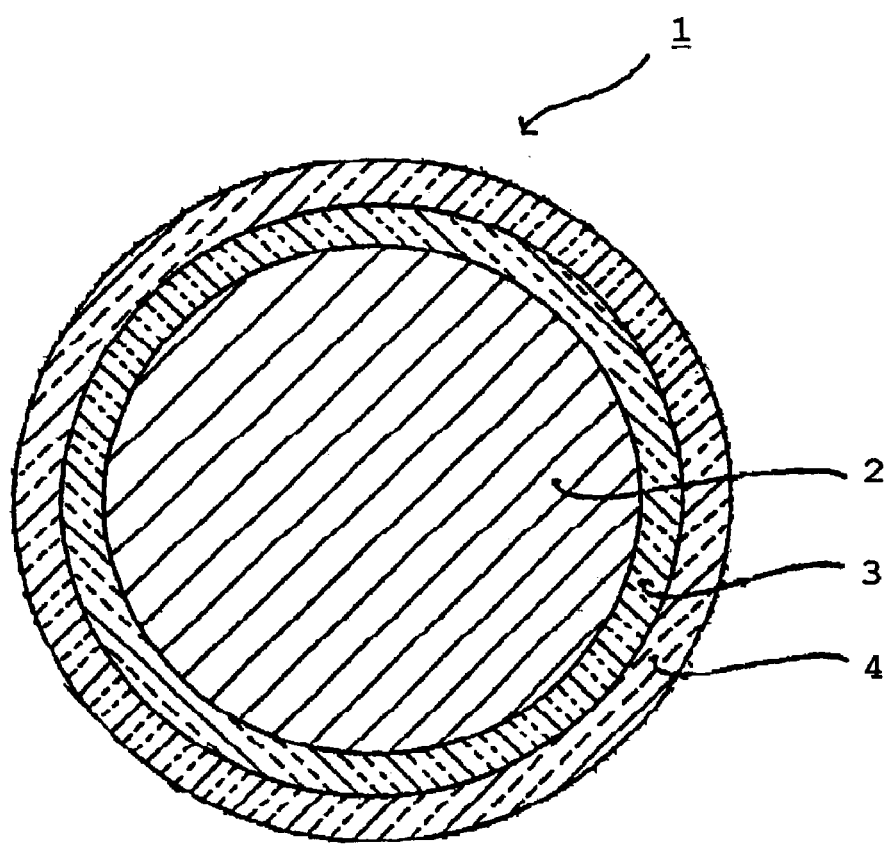

METHOD OF MANUFACTURING AN ENAMEL HAVING A LOW COEFFICIENT OF FRICTION, AND AN ELECTRICAL CONDUCTOR COATED IN SUCH AN ENAMEL

The present invention relates to a method of manufacturing a magnet wire enamel having a low coefficient of friction, and to an electrical conductor coated in such an enamel.

BACKGROUND OF THE INVENTION

In the manufacture of electric motors, the larger the quantity of winding wire that can be incorporated in the core of the stator, the better the performance of the motor. In addition, motor manufacturers also seek to increase manufacturing yield. Thus, in known manner, coils are inserted into stators automatically.

The wires used in such electric motors are typically constituted by an electrical conductor coated in one or more insulating layers based on enamel.

These wires are produced at very high speeds, and they are therefore subjected to high levels of mechanical stress and friction which can damage their insulation and can lead to irregular winding. Inserting coils also leads to the same type of stresses and friction.

To solve that problem, document U.S. Pat. No. 4,693,936 discloses making the outside insulation of said winding wires by means of an enamel obtained by reacting an acid anhydride, a di-isocyanate, and a multi-functional organosiloxane.

The advantage of that kind of enamel lies in the fact that it is made up of a polymer modified by means of polysiloxane. Because polysiloxanes have greater affinity with air than with organic media, they aggregate and migrate towards the surface while the enamel is polymerizing. This migration creates a fine layer that is rich in polysiloxane at the surface of the layer of enamel, with this polysiloxane-rich layer providing the desired sliding properties.

The method described in document U.S. Pat. No. 4,693,936 for manufacturing the above-mentioned enamel consists in:

causing an anhydride to react with an isocyanate; and causing the product obtained in that way to react with a functionalized polysiloxane.

That method is not satisfactory. The polysiloxane does not react completely; as a result the portion of the polysiloxane that has not reacted is free within the polymer and it sublimes while the layer of enamel is polymerizing. This gives rise in particular to damage to the catalyst in the polymerizing oven, and causes it to degrade early.

In addition, the resulting enamel is not stable over time, and after a few hours the enamel is observed to segregate, with a solid deposit forming on the surface of the liquid.

Document US 2001/0020081 discloses a method of manufacturing a polyimide enamel from a functionalized polysiloxane obtained by causing 2,3,3',4'-biphenyltetracarboxylic anhydride (the functionalized monomer involved in synthesizing the enamel) to react with a functionalized polydimethylsiloxane.

The enamel obtained in that way is also unstable, i.e. it precipitates. In addition, it does not possess a coefficient of friction that is as low as desired.

OBJECTS AND SUMMARY OF THE INVENTION

The object of the present invention is thus to develop a method of manufacturing an enamel of the above-mentioned type that does not lead to anticipated deterioration of the polymerizing oven and that enables an enamel to be made which is stable over time and which has improved sliding properties, i.e. a coefficient of friction which is lower than that of prior art enamels.

To this end, the present invention provides a method of manufacturing enamels selected from: polyurethanes, polyamides, polyamide-imides, polyesters, polyester-imides, polyester amide-imides, polyimides, polyepoxy compounds, and polyphenyl oxide compounds; said method comprising synthesizing an enamel by polymerizing a first monomer, a second monomer and a grafted polysiloxane macromonomer. The grafted polysiloxane has an organic segment identical to those of the organic polymer backbone of the enamel. The grafted polysiloxane is formed by reacting a polysiloxane bearing a function group with an excess of a first monomer, having a first functional group that reacts with the functional group bonded to the polysiloxane and a second functional group that reacts with a functional group of the second monomer and oligomerizing the second monomer with the product mixture of step thereby providing a grafted polysiloxane macromonomer with the proviso that the first and second monomers used in the macromonomer forming step are the same as the first and second monomers used in the enamel synthesis step such that the organic segment of the polysiloxane macromonomer is identical to the backbone of the enamel.

Thus, by means of the invention, the polysiloxane is subjected to pre-processing so as to incorporate one or more organic (hydrocarbon) chains identical to those of the backbone of the enamel that is to be synthesized. As a result, during synthesis of the enamel, the grafted polysiloxane macromonomer having organic segments identical to those of the organic polymer backbone of the enamel reacts in full, and no residue remains that could be harmful to the polymerizing oven. Furthermore, the polysiloxane in the form of the grafted polysiloxane macromonomer dissolves better in the organic medium so the resulting final enamel is more stable than in the prior art. In addition, the coefficient of friction of the enamel is considerably smaller than that of prior art enamels.

The organic chains of the enamel contain a repetition of a plurality of consecutive patterns formed respectively by first and second alternating monomers; the length of these chains is a function of the introduced quantities of the first and second monomers.

In practice, in order to synthesize the enamel, it is possible to replace a fraction of the usual di-functionalized monomers with grafted polysiloxane macromonomers.

According to an advantageous characteristic of the invention, prior to synthesizing said enamel, additional polysiloxane bearing a function group is grafted onto said grafted polysiloxane macromonomer.

This serves to further improve the sliding properties of the enamel by increasing the silicone content of the enamel.

In an implementation, said functional groups are selected from acid, anhydride, alcohol, and amine groups.

Preferably, the monomers are di-functionalized.

BRIEF DESCRIPTION OF THE DRAWING

Other characteristics and advantages of the present invention appear in the description below of various implementations of the invention and of an electrical conductor coated in a layer of enamel of the invention, given purely by way of non-limiting illustration.

FIG. 1 is a cross-section view through a conductor of the invention.

MORE DETAILED DESCRIPTION

The conductor 1 comprises an electrically conductive core 2, e.g. of copper, coated in a layer of enamel 3 constituted by a conventional enamel, itself coated in a layer of enamel 4 of the invention, obtained using one of Examples 1 to 3 below. The layer of enamel 4 of the invention is always the outside layer of the coating on the conductor 1 since it provides sliding properties; the conductor 1 may naturally carry one or more other layers of enamel (not shown) in addition to the layer 3 beneath the enamel 4 of the invention.

EXAMPLE 1

In this example, the grafted polysiloxane macromonomer is for use in synthesizing polyamide-imide.

0.15 moles of acid functionalized polysiloxane and 1.5 moles of diphenylmethane di-isocyanate (MDI) constituting the first functionalized monomer are introduced into 1000 grams (g) of N-methylpyrolidone at 80° C.

The mixture is heated to 190° C. and stirred at said temperature for 2 hours. This produces a functionalized polysiloxane oligomer, i.e. comprising isocyanate functional groups.

The solution is then cooled to 120° C. and 1.2 moles of trimellitic anhydride (TMA) are added at the second functionalized monomer. The mixture is heated to 160° C. for 2 hours. A polysiloxane is obtained that is grafted with short organic chains identical to those of the final polyamide-imide enamel.

0.3 moles of polysiloxane are then reacted by heating the mixture to 190° C. and then stirring the mixture at said temperature for 1 hour.

The resulting diacid is then introduced into the synthesis of the polyamide-imide, taking the place of a varying fraction of the usual diacids (terephthalic acid, isophthalic acid, adipic acid, etc. . . . ). This synthesis is entirely conventional and well known to the person skilled in the art; it is therefore not described in greater detail herein. Reference can be made for this purpose to document U.S. Pat. No. 4,750,576, for example.

EXAMPLE 2

In this example, the grafted polysiloxane macromonomer is for use in the synthesis of the polyamide.

0.15 moles of acid functionalized polysiloxane and 1.5 moles of MDI as the first functionalized monomer are added into 1000 g of N-methylpyrrolidone at 80° C.

The mixture is heated to 190° and stirred at said temperature for 2 hours. A functionalized polysiloxane oligomer is obtained, i.e. comprising isocyanate functional groups.

The solution is then cooled to 120° C. and 1.2 moles of terephthalic acid (TPA) as the second functionalized monomer are added. The mixture is heated to 160° C. for 2 hours and stirred at said temperature for 1 hour. This produces a polysiloxane grafted with short organic chains identical to those of the final polyamide enamel.

0.3 moles of polysiloxane are then caused to react by heating the mixture to 190° C., and the mixture is then stirred at said temperature for 1 hour.

The resulting diacid is then introduced into the synthesis of the polyamide-imide, taking the place of a varying fraction of the usual diacids (terephthalic acid, isophthalic acid, adipic acid, etc. . . . ). This synthesis is entirely conventional and well known to the person skilled in the art; it is therefore not described in greater detail herein. Reference can be made for this purpose to document U.S. Pat. No. 4,740,576, for example.

EXAMPLE 3

In this example, the grafted polysiloxane macromonomer is for use in synthesizing polyester or polyester-imide.

0.15 moles of acid functionalized polysiloxane and 1.5 moles of methyl ethyl glycol as the first functionalized monomer are added into 1000 g of cresol. A functionalized polysiloxane oligomer is obtained, i.e. comprising alcohol functional groups.

After the reaction, 1.2 moles of terephthalic acid (TPA) as the second functionalized monomer are added to the solution. The mixture is allowed to react to form an alcohol-grafted polysiloxane with short organic chains identical to those of the final polyester or polyester-imide enamel.

0.3 moles of polysiloxane are then caused to react.

The diacid formed in this way is then introduced into the synthesis of the polyester or polyester-imide that is involved in synthesizing polyurethanes, replacing a varying fraction of the usual diacids.

Here again the synthesis is entirely conventional and well known to the person skilled in the art.

The embodiment thus makes it possible to obtain enamels having low coefficients of friction, suitable for use in particular for coating electrical conductors for use in making coils for electric motors. The method of the invention leads to products being made that are stable over time and does not lead to damage to polymerizing ovens given that the polysiloxane is stabilized.

The use of a grafted polysiloxane of the invention in the conventional method of synthesizing enamels does not require any modification to said method and leads to enamels having properties other than coefficients of friction that are entirely compatible to those of existing enamels.

Finally, given that the synthesis of the grafted polysiloxane can be performed during a prior step separate from synthesizing the enamel itself, it is possible for this synthesis to be performed under operating conditions that are stricter so as to be certain of obtaining total reaction of the various reagents, without penalizing manufacture of the enamel itself.

Naturally, the present invention is not limited to the implementation described above.

In particular, the functionalized monomers and the reactive groups can be constituted by any of the substances conventionally used in the manufacture of enamels, providing reagent groups are selected that are suitable for reacting together.

Finally, any means may be replaced by equivalent means without going beyond the ambit of the present invention.

What is claimed is:

1. A method of manufacturing an enamel selected from: polyurethanes, polyamides, polyamide-imides, polyesters, polyester-imides, polyester amide-imides, polyimides, polyepoxy compounds, and polyphenyl oxide compounds; said method comprising the step of:

synthesizing an enamel by polymerizing a first monomer, a second monomer and a grafted polysiloxane macromonomer, said grafted polysiloxane having an organic segment identical to those of the organic polymer backbone of the enamel;

wherein said grafted polysiloxane is formed by (i) reacting a polysiloxane bearing a functional group with an excess of a first monomer, having a first functional group that reacts with the functional group bonded to said polysiloxane and a second functional group that reacts with a functional group of the second monomer and (ii) oligomerizing the second monomer with the product mixture of step (i), thereby providing a grafted polysiloxane macromonomer with the proviso that the first and second monomers used in the macromonomer forming step are the same as the first and second monomers used in the enamel synthesis step such that the organic segment of the polysiloxane macromonomer is identical to the backbone of the enamel.

2. A method according to claim 1, wherein, prior to synthesizing said enamel, additional polysiloxane is grafted onto said polysiloxane macromonomer.

3. A method according to claim 1, wherein said functional groups are selected from acid, anhydride, alcohol, and amine groups.

4. A method according to claim 1, wherein said first and second monomers are di-funetionalized.

5. An electrical conductor coated in a layer of enamel obtained by the method according to claim 1.

* * * * *